(12) United States Patent
Akiyama

(10) Patent No.: US 9,709,830 B2
(45) Date of Patent: Jul. 18, 2017

(54) PHASE MODULATION DEVICE AND METHOD OF CONTROLLING THE DEVICE

(71) Applicant: FUJITSU LIMITED, Kawasaki-shi, Kanagawa (JP)

(72) Inventor: Suguru Akiyama, Tsukuba (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/635,308

(22) Filed: Mar. 2, 2015

(65) Prior Publication Data

US 2015/0277158 A1 Oct. 1, 2015

(30) Foreign Application Priority Data

Mar. 28, 2014 (JP) ................................. 2014-069996

(51) Int. Cl.
*G02F 1/035* (2006.01)
*G02F 1/025* (2006.01)
(Continued)

(52) U.S. Cl.
CPC ............ *G02F 1/025* (2013.01); *G02F 1/2257* (2013.01); *H04B 10/5051* (2013.01); *G02F 2001/212* (2013.01)

(58) Field of Classification Search
CPC .... G02F 1/025; G02F 1/2257; G02F 2201/16; H04B 10/5051
(Continued)

(56) References Cited

U.S. PATENT DOCUMENTS 4,288,785 A * 9/1981 Papuchon ................. G02F 7/00
341/111
7,277,603 B1 * 10/2007 Roberts ................. G02F 1/0121
385/1
(Continued)

FOREIGN PATENT DOCUMENTS

GB 2384570 A * 7/2003 ............. G02F 1/225
JP 2012-42532 3/2012
WO 2011043079 4/2011

OTHER PUBLICATIONS

"12.5-Gb/s operation with 0.29-V*cm V*L using silicon Mach-Zehnder modulator based-on forward-biased pin diode" by Akiyama et al, Optics Express, vol. 20, No. 3, pp. 2911-2923, Jan. 2012.*
(Continued)

*Primary Examiner* — Robert Tavlykaev
(74) *Attorney, Agent, or Firm* — Fujitsu Patent Center

(57) ABSTRACT

A phase modulation device including a diode-type phase modulator having a pair of side terminals connected to two sides of an optical waveguide core along an optical axis of the optical waveguide core, and a control unit that controls electrical signals to be input to the phase modulator, the side terminal of the phase modulator being divided into a plurality of portions along the optical axis of the optical waveguide core, the phase modulator having electrodes 15 respectively provided on the divided side terminals and electrically separated from each other, the control unit having switches and constant-current sources connected to the electrodes of the side terminals and controls stepwise the amount of change in phase of propagating light in the optical waveguide core according to the number of the switches turned on.

5 Claims, 7 Drawing Sheets

(51) Int. Cl.
G02F 1/225 (2006.01)
H04B 10/50 (2013.01)
G02F 1/21 (2006.01)

(58) Field of Classification Search
USPC .......................................................... 385/1–3
See application file for complete search history.

(56) References Cited

U.S. PATENT DOCUMENTS

| 8,238,017 | B2* | 8/2012 | Tu | ............................ | G02F 1/011 |
|---|---|---|---|---|---|
| | | | | | 327/105 |
| 2002/0195622 | A1* | 12/2002 | Ishimura | ................. | B82Y 20/00 |
| | | | | | 257/200 |
| 2004/0016920 | A1* | 1/2004 | Akiyama | .............. | G02F 1/2257 |
| | | | | | 257/14 |
| 2004/0052491 | A1* | 3/2004 | Otake | ................... | G02F 1/2257 |
| | | | | | 385/131 |
| 2010/0156679 | A1* | 6/2010 | Ehrlichman | .......... | G02F 1/0121 |
| | | | | | 341/50 |
| 2011/0044573 | A1* | 2/2011 | Webster | ................ | G02F 1/0121 |
| | | | | | 385/3 |
| 2011/0235971 | A1* | 9/2011 | Hashimoto | ............ | B82Y 20/00 |
| | | | | | 385/31 |
| 2012/0230626 | A1* | 9/2012 | Metz | .................. | H04B 10/5051 |
| | | | | | 385/3 |
| 2012/0251032 | A1 | 10/2012 | Kato | | |
| 2013/0170782 | A1* | 7/2013 | Evans | ..................... | G02F 1/225 |
| | | | | | 385/3 |
| 2014/0199014 | A1* | 7/2014 | Velthaus | ............... | G02F 1/2255 |
| | | | | | 385/3 |
| 2014/0233962 | A1* | 8/2014 | Kato | ....................... | G02F 1/025 |
| | | | | | 398/183 |

OTHER PUBLICATIONS

Suguru Akiyama et al., "Compact PIN-Diode-Based Silicon Modulator Using Side-Wall-Grating Waveguide", IEEE Journal of Selected Topics in Quantum Electronics, vol. 19, No. 6, pp. 3401611-3401611 (11 pages), Nov./Dec. 2013.

Xiaotie Wu et al., "A 20Gb/s NRZ/PAM-4 1V Transmitter in 40nm CMOS Driving a Si-Photonic Modulator in 0.13 μm CMOS", ISSCC 2013 / Session 7 / Optical Transceivers and Silicon Photonics / 7.7. Feb. 19, 2013 IEEE International Solid-State Circuits Conference, Digest of Technical Papers Proceedings, pp. 128-129 (3 pages).

Suguru Akiyama et al.,"Compact PIN-Diode-Based Silicon Modulator Using Side-Wall-Grating Waveguide", IEEE Journal of Selected Topics in Quantum Electronics, Sep. 25, 2013, vol. 19, No. 6, p. 3401611-1-3401611-11.

JPOA—Office Action of Japanese Patent Application No. 2014-069996 dated Jun. 6, 2017, with full English translation of the Office Action.

* cited by examiner

PHASE CHANGE

CURRENT

PHASE MODULATION DEVICE AND METHOD OF CONTROLLING THE DEVICE

CROSS-REFERENCE TO RELATED APPLICATION

This application is based upon and claims the benefit of priority of the prior Japanese Patent Application No. 2014-069996, filed on Mar. 28, 2014, the entire contents of which are incorporated herein by reference.

FIELD

The present embodiment relates to a phase modulation device and a method of controlling the phase modulation device.

BACKGROUND

In the operation of an optical element such as a Mach-Zehnder modulator, there is a need to adjust the difference in phase of propagating light between arms in two optical waveguides (called arms) constituting a Mach-Zehnder interferometer to a desired value with improved efficiency and with improved controllability by means of a direct-current voltage. Forward bias voltages are supplied to pin diodes formed in the optical waveguides to inject electron and hole carriers into an optical waveguide core, thereby enabling such phase adjustment to be performed with efficiency. Structures including rib waveguides or side grating waveguides, for example, have been disclosed as structures for such phase modulators using pin diodes. An art relating to a structure including side grating waveguides is disclosed in Non-Patent Document 1: S. Akiyama et al., "Compact PIN-Diode-Based Silicon Modulator Using Side-Wall-Grating Waveguide," *IEEE JOURNAL OF SELECTED TOPICS IN QUANTUM ELECTRONICS*, VOL. 19, NO. 6, pp. 3401611-3401611, 2013.

In a phase modulator having side grating waveguides, an optical waveguide core is undoped, one of the side grating waveguides in the form of fins is doped with a p-type impurity, and the other of the side grating waveguides is doped with an n-type impurity, thereby forming pin diodes. Voltages are applied in forward directions to the diodes to inject electrons and holes into the optical waveguide core through the side grating waveguides, thereby changing the phase of propagating light. In such phase adjustment, there is a need to adjust stepwise the phase of propagating light ordinarily from 0 to $\pi$ with a sufficiently small pitch. The phase modulator having the side grating waveguides is capable of changing the phase of propagating light in such a way by continuously changing voltages supplied to electrodes of the phase modulator.

The conventional diode-type phase modulator using forward bias voltages has the advantage of having a high efficiency of phase change with respect to a voltage input per unit length of the phase modulator.

FIG. 7 is a characteristic diagram illustrating voltage dependences of phase change (FIG. 7A) and current (FIG. 7B) in the conventional phase modulator having side grating waveguides. With a short operating length of about 250 µm, changes in phase from 0 to $\pi$ are obtained by changing voltages supplied to the phase modulator from 0 to 1 V in the forward direction with respect to the diodes.

On the other hand, there is a demand for changing the phase of propagating light stepwise in a simple and convenient way with improved controllability even in a high-speed multivalue modulator. Device structures each having, for this purpose, a plurality of phase modulators with separate electrodes connected one after another along an optical axis are disclosed in Patent Document 1: International Publication Pamphlet No. WO2011/043079, and Non-Patent Document 2: X. Wu et al., "A 20 Gb/s NRZ/PAM-4 1V transmitter in 40 nm CMOS driving a Si-photonic modulator in 0.13 µm CMOS" in 2013 *IEEE International Solid-State Circuits Conference Digest of Technical Papers, Proceedings*, pp. 128-129. In this type of device structure, voltages supplied to divided small phase modulators are binary on-off signals, and the phase change in the entire element is modulated stepwise according to the number of small phase modulators turned on.

The pin diode phase adjustment method conventionally used is thought to ensure an improved efficiency but entails a difficulty in performing phase control with high accuracy and stability for phase adjustment. As indicated in FIG. 7, the phase is exponentially changed by a range of voltage about 0.6 to 0.8 V in which the diode is turned on. Also, the gradient of phase change with respect to the voltage after the diode is turned on is considerably steep and the phase is changed largely by a small change in voltage. Adjusting the phase stepwise to the desired value with respect to such a nonlinear function requires correctly grasping the function in advance and applying a voltage to the pin diode such as to compensate for the change. The circuit for voltage control is therefore made complicated, which leads to an increase in cost. Further, even in a case where such control is performed, it is necessary to control stepwise the voltage to be supplied to the diode with an accuracy of 0.1 V or less in order to perform phase adjustment stepwise with accuracy. In general, it is difficult to control with an accuracy of about 0.1 V a voltage generated in an electronic circuit having a CMOS transistor or the like, and sufficient controllability is not obtained in the case of such control. Thus, the challenge to the conventional phase adjustment method using pin diodes is to perform control in a simple and convenient way with improved controllability.

In the case of the device structures disclosed in Patent Document 1 and Non-Patent Document 2, voltages supplied to divided small phase modulators are binary on-off signals, as described above, and there is no need to set stepwise the voltages to be supplied to the phase modulators. Therefore, stepped phase changes can be made with a drive circuit in a simple and convenient way. In these related arts, however, phase modulators of a multiple quantum well structure or the like to be used with MOS capacitances and inverse bias voltages, which are suitable for high-speed modulation but are low in phase modulation efficiency, are used. The challenge to these related arts is to increase the phase modulation efficiency. Also, these phase modulators have no such nonlinearity in phase change, as that of pn diodes, and no description has been made of any method for causing a certain phase change in a simple and convenient way with improved controllability in divided individual small phase modulators when a nonlinearity such as that of diodes exists.

SUMMARY

One mode of a phase modulation device includes a diode-type phase modulator having a pair of side terminals connected to two sides of an optical waveguide core along an optical axis of the optical waveguide core, and a control unit that controls electrical signals to be input to the phase modulator, wherein the phase modulator has at least one of the side terminals divided into a plurality of portions along the optical axis of the optical waveguide core, and has electrodes respectively provided on the divided side terminals and electrically separated from each other, and wherein the control unit has switches and constant-current sources connected to the electrodes and controls stepwise the amount of change in phase of propagating light in the optical waveguide core according to the number of the switches turned on.

In one mode of a method of controlling a phase modulation device including a diode-type phase modulator having a pair of side terminals connected to two sides of an optical waveguide core along an optical axis of the optical waveguide core, the phase modulator having at least one of the side terminals divided into a plurality of portions along the optical axis of the optical waveguide core, the phase modulator having electrodes respectively provided on the divided side terminals and electrically separated from each other, the phase modulation device having switches and constant-current sources connected to the electrodes, the amount of change in phase of propagating light in the optical waveguide core being controlled stepwise according to the number of the switches turned on.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Concrete embodiments of a phase modulation device and a method of controlling the phase modulation device will be described below in detail with reference to the accompanying drawings.

First Embodiment

Figure 1:
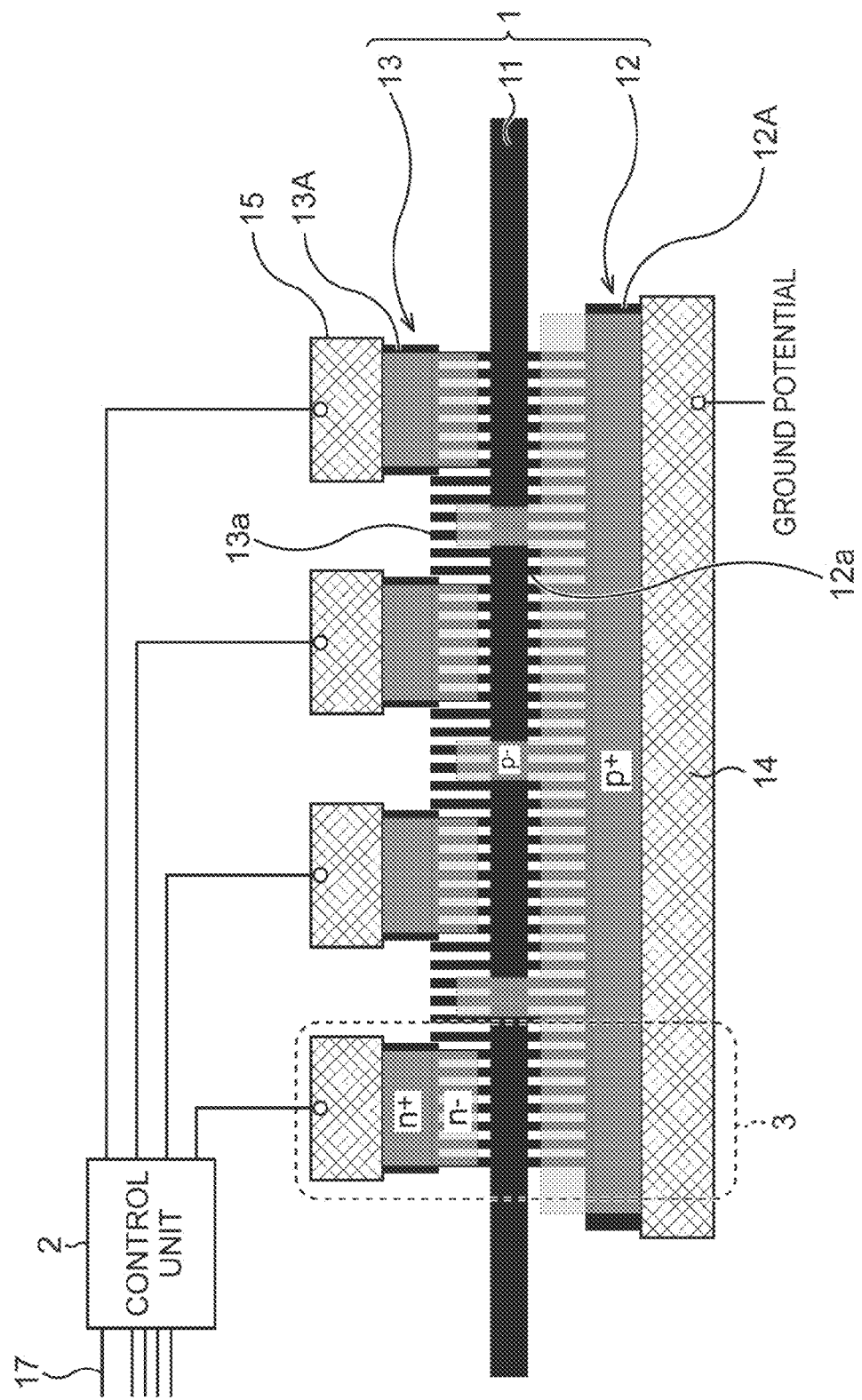
FIG. 1 is a schematic plan view for outlining the construction of a phase modulation device according to a first embodiment.

The first embodiment will be described. FIG. 1 is a schematic plan view for outlining the construction of a phase modulation device according to the first embodiment.

This phase modulation device is constructed by being provided with a phase modulator 1 formed on a predetermined substrate, and a control unit 2 that controls electrical signals to be input to the phase modulator 1.

The phase modulator 1 has an optical waveguide core 11 and a pair of side grating waveguides 12 and 13 provided on opposite sides of the optical waveguide core 11 along the lengthwise direction. These portions are constructed by being integrally formed by a single silicon layer or the like. A cladding not illustrated, which is formed of a silicon oxide for example, is provided on the optical waveguide core 11 and the side grating waveguides 12 and 13, and electrodes 14 and 15 connected to the side grating waveguides 12 and 13 are provided.

The optical waveguide core 11 is a portion through which an optical signal propagates along the lengthwise direction, and which is in an undoped state, not doped with any impurity.

The side grating waveguide 12 has a multiplicity of fins 12a and is connected to the optical waveguide core 11 along one of side surfaces of the optical waveguide core 11. A side terminal 12A provided as an electrode formation portion connected to the fins 12a along this side surface is formed. The fins 12a have a width of about 80 nm for example, and a period of about 285 nm for example. In the side grating waveguide 12, a p-type region doped with a p-type impurity, e.g., boron (B) is formed, the side terminal 12A being a $p^+$-type doped region, (part of) portions of the fins 12a being each a $p^-$-type doped region.

The side grating waveguide 13 has a multiplicity of fins 13a and is connected to the optical waveguide core 11 along the other side surface of the optical waveguide core 11. A plurality of small side terminals 13A provided as electrode formation portions connected to the fins 13a along this side surface are formed. In the present embodiment, the fins 13a have a width of about 80 nm for example, and a period of about 285 nm for example. Fifteen side terminals 13A (only four side terminals 13A are illustrated in FIG. 1), for example, are provided.

In the phase modulator 1, the shape of the waveguide core 11 and the grating periodicity of the side grating waveguides 12 and 13 along the optical axis direction are made uniform through the entire phase modulator 1 in order to prevent scattering loss and reflection of propagating light due to discontinuities in the waveguide.

The side terminals 13A are arranged by being spaced apart one from another by a predetermined distance of, for example, about 3 μm while being electrically separated from each other, and are capable of functioning independently of each other. The side grating waveguide 13 has an n-type region doped with an n-type impurity, e.g., phosphorus (P) and formed in side terminal 13A forming portions, each side terminal 13A being an $n^+$-type doped region, (part of) portions of the fins 13a connected to the side terminals 13A being each an $n^-$-type doped region. The $p^-$-type doped region in the fins 12a is extended to be formed in (part of) portions of the fins 13a between the side terminals 13A. This extended $p^-$-type doped region improves the reliability of electrical separation between each adjacent pair of side terminals 13A.

The electrode 14 is made of Al for example, formed along the lengthwise direction of the side terminal 12A, and connected to the side terminal 12A. The electrode 14 is maintained at ground potential.

Each electrode 15 is made of Al for example, and connected to the corresponding side terminal 13A.

In the present embodiment, a portion surrounded by a broken line in FIG. 1 in correspondence with each of the combinations of the side terminals 13A and the electrodes 15 is defined as a small phase modulator 3 in which a pin diode is formed. A constant current is caused to flow through the diode with a forward bias voltage so that the concentrations of carriers (electrons and holes) in the optical waveguide core 11 at the PN junction of the diode are changed. Thus, the phase of light propagating through the optical waveguide core 11 is changed by utilizing the plasma effect.

Figure 2:
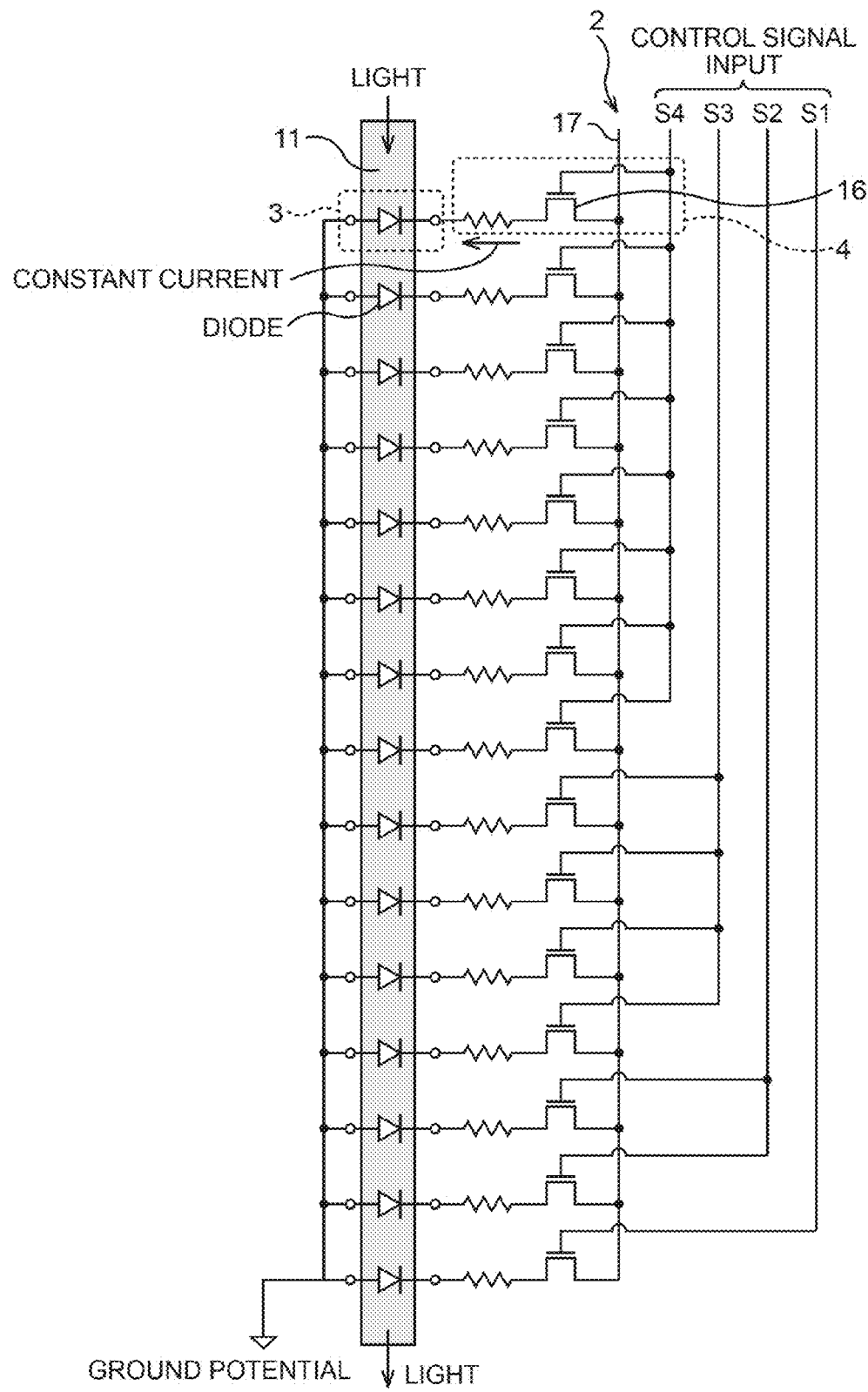
FIG. 2 is a schematic plan view concretely illustrating a control unit in the phase modulation device according to the first embodiment.

As illustrated in FIG. 2, the control unit 2 is connected to the electrode 15 for each small phase modulator 3 and has a plurality of control circuits 4 each having a switch 16. A power supply line 17 is connected in common to the switches 16 in all the control circuits 4. Each control circuit 4 forms a constant-current source that supplies a predetermined constant current to the small phase modulator 3 by being supplied with a voltage from the power supply line 17. The constant current is set so that the voltage applied to the diode of the small phase modulator 3 is equal to or higher than a predetermined voltage in the forward direction, 0.9 V in the present embodiment. When the switch is on, the constant current flows through the diode with the forward bias voltage, thereby injecting carriers into the optical waveguide core 11. When the switch 16 is off, the terminal of the diode is grounded and no current flows. Both the electrodes 14 and 15 may be set to ground potential when the switch 16 is off. The control unit 2 controls stepwise the amount of change in phase of light propagating through the phase modulator 1 according to the existence or nonexistence of the constant currents supplied from the control circuits 4, i.e., the number of switches 16 turned on.

Each of groups of control circuits 4 defined one after another as $2^{i-1}$ (i=1, 2, ... ) numbers of control circuits 4 are bound together and control signals are input to the bound groups of control circuits 4. In the present embodiment, i=1, 2, 3, 4. A control signal line S1 is connected to one of the control circuits 4; a control signal line S2, to two of the control circuits 4; a control signal line S3, to four of the control circuits 4; and a control signal line S4, to eight of the control circuits 4. The control signals are simultaneously input respectively to the bound groups of control circuits 4. As a result, the phase of propagating light can be changed in sixteen steps from 0 to about π by four-bit control signals, thus enabling simple and convenient control with a small number of bits.

Design in terms of the length and the number of side terminals 13A and the current value of the constant-current source will subsequently be described.

Figure 7A:
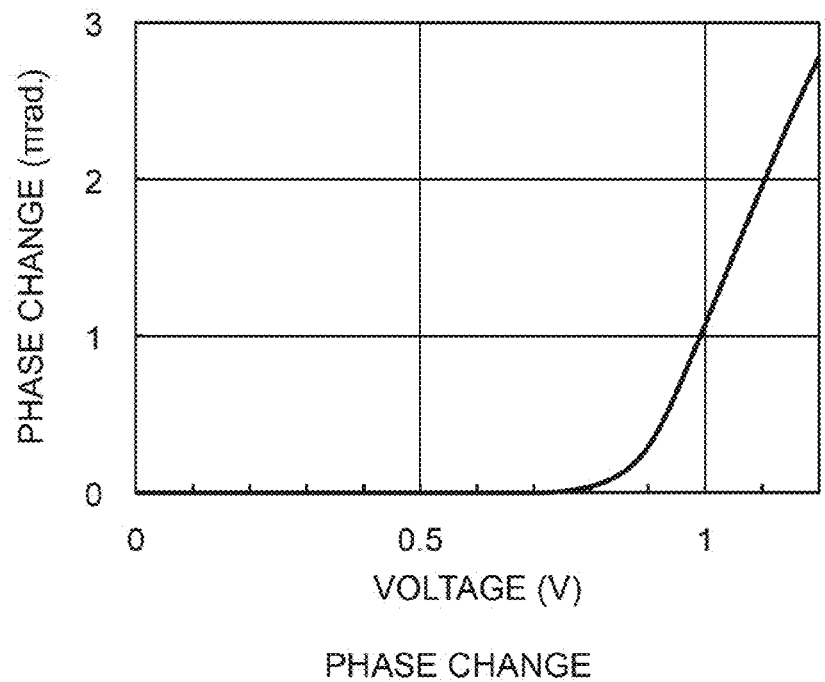
FIG. 7A is a characteristic diagram illustrating voltage dependences of phase change in a conventional phase modulator having side grating waveguides.
Figure 7B:
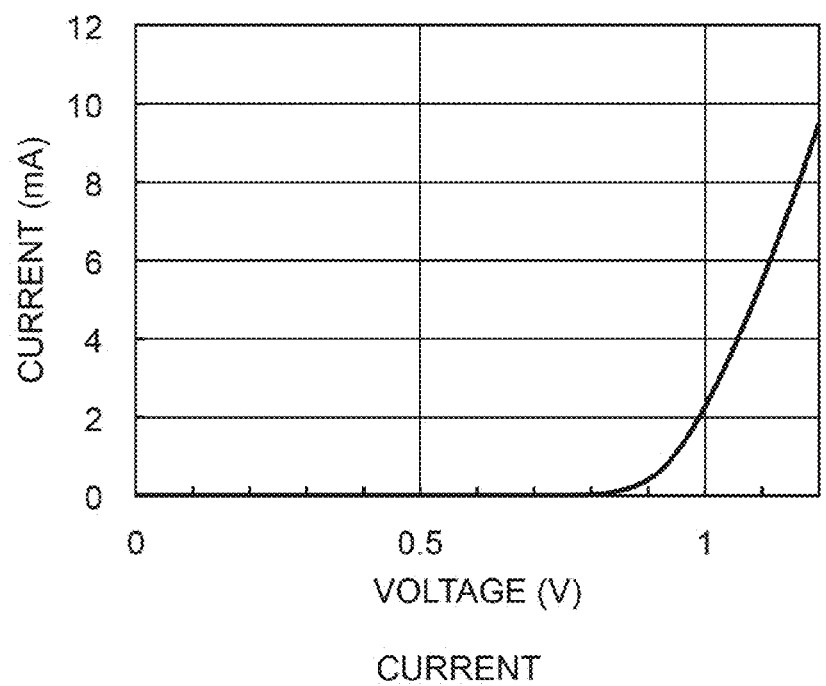
FIG. 7B is a characteristic diagram illustrating voltage dependences of current in a conventional phase modulator having side grating waveguides.

As indicated in FIG. 7, in the conventional phase modulator having side grating waveguides (an operating length of about 250 μm), an exponential nonlinear increase is exhibited as a change in phase with respect to a voltage range up to about 0.95 V and substantially no phase change is obtained when the voltage is equal to or lower than about 0.8 V. When the voltage is equal to or higher than about 0.95 V, a generally linear change in phase is exhibited with respect to the voltage but the gradient of the change is considerably steep. There is a demand for obtaining a range of phase change up to π in the phase modulator. As can be understood from FIG. 7, a range of phase change from 0 to about π can be obtained by applying a forward bias voltage of about 1 V with an operating length of about 250 μm.

In the present embodiment, the length of each side terminal 13A in the small phase modulators 3 is set to about 17 μm and the fifteen small phase modulators 3 identical in structure to each other are connected together. Accordingly, the total length of the small phase modulators 3 is about 255 μm. From the voltage-current characteristic in FIG. 7B, the current flowing when a voltage of about 1 V is supplied to the phase modulator having a length of about 250 μm is about 2.2 mA.

Assuming that a current proportional to the length of the phase modulator flows, the current flowing through each of the side terminals 13A uniform in structure and voltage setting and having a length of about 17 μm is about 147 μA. In the present embodiment, therefore, a current setting of 147 μA is made for each constant-current source. With the above-described settings, the change in phase caused in light propagating through the phase modulator 1 can be modulated in sixteen steps from 0 to about π by changing from 0 to 15 as desired the numbers of switches 16 turned on in the switches 16 connected to the small phase modulators 3.

As can be understood from FIG. 7, the current flowing through the phase modulator having an operating length of about 250 μm increases exponentially with approach to about 0.95 V. Accordingly, substantially no current flows when the voltage is equal to or lower than about 0.8 V. When the voltage range is higher than about 0.95 V, the increase in current with respect to the voltage is linear. From this, it is thought that most of the voltage supplied from each control circuit is applied to the series resistance of the phase modulator, and that the voltage applied to the PN junction is saturated. It is thought that in this case the value of the current flowing through each control circuit can be controlled comparatively accurately by means of the power supply voltage to the control circuit and the series resistance of the phase modulator including the control circuit.

In the present embodiment, the phase of propagating light can be adjusted efficiently from 0 to about π with improved controllability by using the phase modulator 1 having a substantially small overall operating length of about 250 μm.

In the present embodiment, as described above, only two voltages: on-voltage and off-voltage are supplied to the diodes of the small phase modulators 3. There is, therefore, no need to perform control factoring in a function for non-linear phase change with respect to the voltage between the on- and off-voltages, and there is no need to change stepwise with high accuracy the voltage to be supplied to the phase modulator 1. The control circuits 4 of a simple and convenient configuration can therefore be used.

The amount of phase change obtained by the entire phase modulator 1 is controlled through the number of switches 16 turned on in the switches 16 connected to the small phase modulators 3. The total amount of phase change is a value obtained by adding up the phase changes obtained by the small phase modulators 3, and the amounts of phase change obtained by the small phase modulators 3 are equal to each other if the small phase modulators 3 are identical in structure to each other. Therefore, the phase change proportional to the number of switches 16 turned on can be obtained and phase adjustment can be performed with improved controllability. In the present embodiment, the switches 16 in all the control circuits 4 are turned on to obtain the maximum phase change and, since the operation of the phase modulator in this case is equivalent to that of the single phase modulator in the conventional art, efficient phase adjustment equivalent to that in the conventional art can be performed. Also, a setting is made such that when each switch 16 is on, the voltage applied to the diode is 0.9 V or higher in the forward direction. In this case, the resistance of the diode is sufficiently low. Therefore, the value of the current flowing through the diode can be controlled with high accuracy by suitably setting the power supply voltage to the constant-current source and the resistance of the constant-current source. As a result, the phase change can be obtained with stability in the phase modulator 1. That is, in the present embodiment, phase modulation improved in efficiency and in controllability simultaneously can be performed with the phase modulation device using the simple and convenient method.

A method of manufacturing the phase modulation device having the above-described configuration will subsequently be described.

Figure 3A:
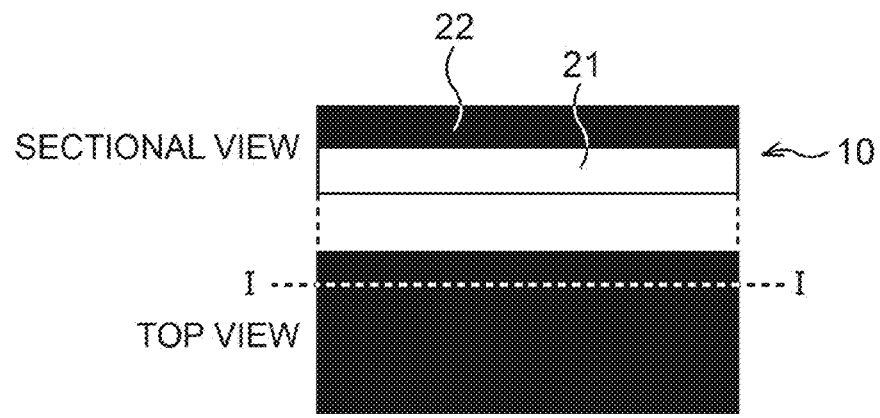
FIGS. 3A to 3C are schematic diagrams successively illustrating process steps in a method of manufacturing the phase modulation device according to the first embodiment.
Figure 3B:
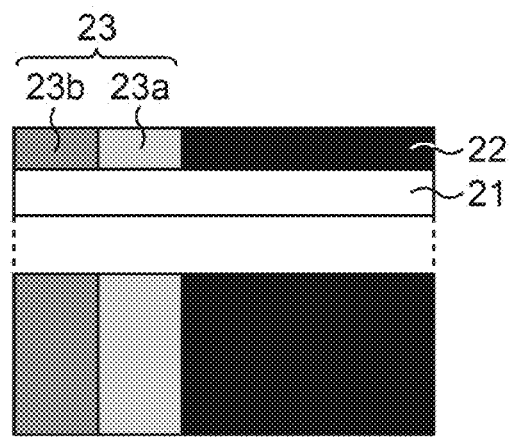
Figure 3C:
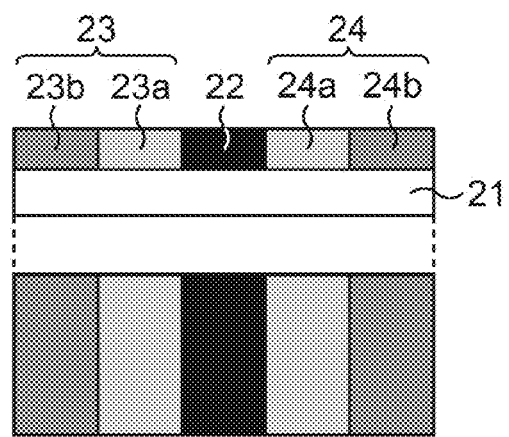
Figure 4A:
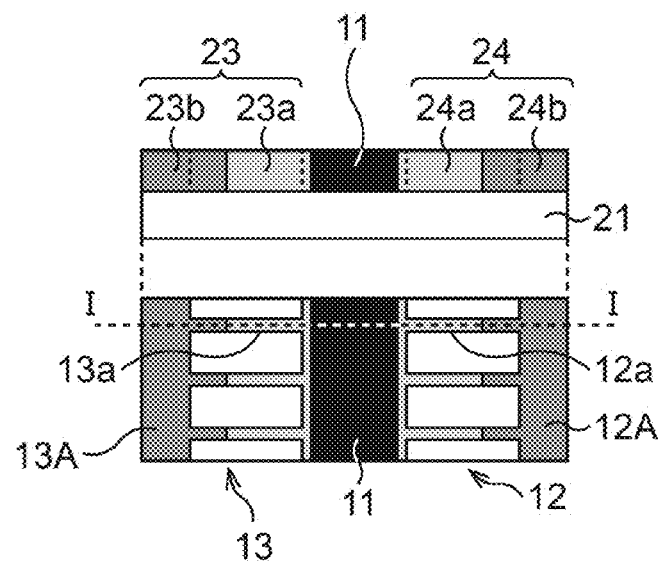
FIGS. 4A to 4C are schematic diagrams successively illustrating process steps in the method of manufacturing the phase modulation device according to the first embodiment after FIG. 3.
Figure 4B:
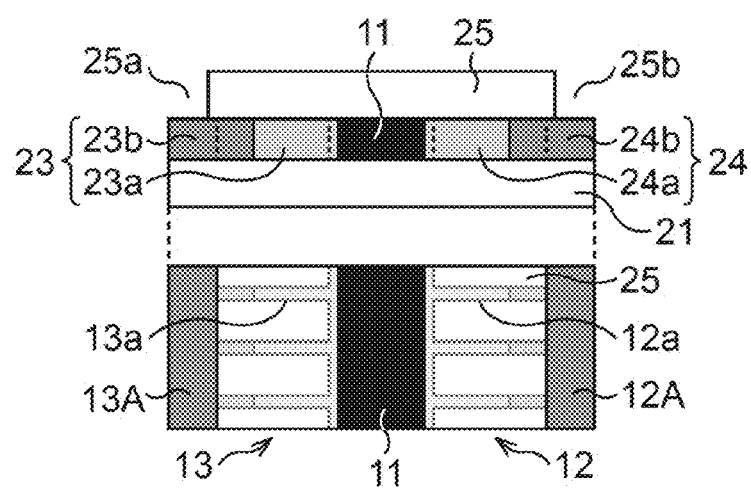
Figure 4C:
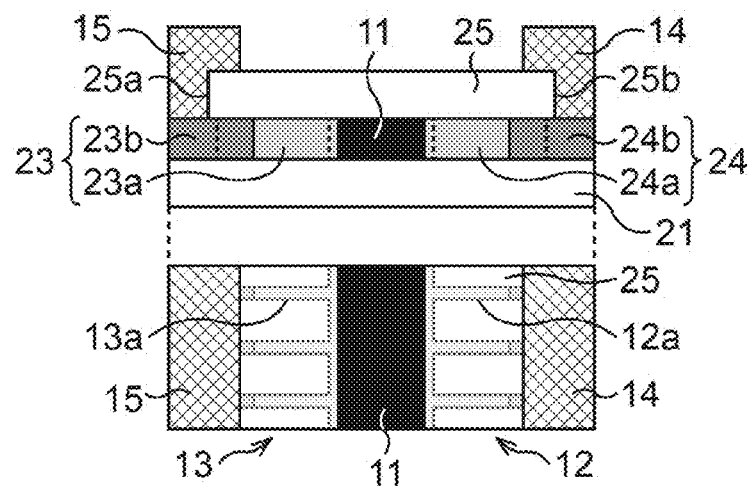

FIGS. 3 to 4 are schematic diagrams successively illustrating process steps in a method of manufacturing the phase modulation device according to the first embodiment. In each of FIGS. 3A to 3C and 4A to 4C, a lower figure is a plan view while an upper figure is a sectional view taken along broken line I-I in the lower figure.

First, as illustrated in FIG. 3A, a silicon on insulator (SOI) substrate 10 is prepared. The SOI substrate 10 is formed by providing a SOI layer 22 having a thickness of about 220 nm on a buried oxide layer 21.

Subsequently, as illustrated in FIG. 3B, an n-type doped region 23 is formed in a left-hand potion in a surface of the SOI layer 22 as viewed in FIG. 3B.

More specifically, a resist mask exposing one side portion is formed on the surface of the SOI layer 22, and the exposed portion is doped with an n-type impurity, e.g., phosphorus ($P^+$) or arsenic ($As^+$). The resist mask is removed by a wet treatment or an asking treatment.

Next, a resist mask exposing a portion of the surface of the SOI layer 22 in the above-described doped portion closer to a center of the surface is formed, and the exposed portion is doped with an n-type impurity, e.g., phosphorus ($P^+$) or arsenic ($As^+$) at a concentration higher than that in the above-described doping. The resist mask is removed by a wet treatment or an ashing treatment.

Thus, the n-type doped region 23 formed of an $n^-$-type doped region 23a and an $n^+$-type doped region 23b located outside and adjacent to the $n^-$-type doped region 23a is formed in the left-hand portion of the surface of the SOI layer illustrated in FIG. 3B. The $n^-$-type doped region 23a is a region doped to be an n-type ($n^-$-type) having a comparatively low concentration, while the $n^+$-type doped region 23b is a region doped to be an n-type ($n^+$-type) having a concentration higher than that in the $n^-$-type doped region 23a.

Subsequently, as illustrated in FIG. 3C, a p-type doped region 24 is formed in a right-hand potion in the surface of the SOI layer 22 as viewed in FIG. 3C.

More specifically, a resist mask exposing another side portion is formed on the surface of the SOI layer 22, and the exposed portion is doped with a p-type impurity, e.g., boron ($B^+$). The resist mask is removed by a wet treatment or an ashing treatment.

Next, a resist mask exposing a portion of the surface of the SOI layer 22 in the above-described doped portion closer to the center of the surface is formed, and the exposed portion is doped with a p-type impurity, e.g., boron ($B^+$) at a concentration higher than that in the above-described doping. The resist mask is removed by a wet treatment or an asking treatment.

Thus, the p-type doped region 24 formed of a $p^-$-type doped region 24a and a $p^+$-type doped region 24b located outside and adjacent to the $p^-$-type doped region 24a is formed in the right-hand portion of the surface of the SOI layer 22 illustrated in FIG. 3C. The $p^-$-type doped region 24a is a region doped to be a p-type ($p^-$-type) having a comparatively low concentration, while the $p^+$-type doped region 24b is a region doped to be a p-type ($p^+$-type) having a concentration higher than that in the $p^-$-type doped region 24a.

Subsequently, as illustrated in FIG. 4A, the SOI layer 22 is worked to form the optical waveguide core 11 and the side grating waveguides 12 and 13.

More specifically, the SOI layer 22 is worked by lithography and dry etching. The optical waveguide core 11 and the side grating waveguides 12 and 13 are thereby integrally formed of silicon film of the SOI layer 22. In the side grating waveguide 12, part of the fins 12a are formed by the $p^-$-type doped region 24a, and the side terminal 12A and the remaining part of the fins 12a are formed by the $p^+$-type doped region 24b. In the side grating waveguide 13, part of the fins 13a are formed by the $n^-$-type doped region 23a, and the side terminals 13A and the remaining part of the fins 13a are formed by the $n^+$-type doped region 23b.

Subsequently, as illustrated in FIG. 4B, a cladding 25 is formed on the optical waveguide core 11 and the side grating waveguides 12 and 13.

More specifically, silicon oxide film is deposited to a thickness of about 1 μm on the optical waveguide core 11 and the side grating waveguides 12 and 13 by chemical vapor deposition (CVD) or the like, and a pair of openings are formed by working the silicon oxide film by lithography and dry etching. Thus, the cladding having electrode openings 25a and 25b through which portions of the side terminal 12A and the side terminals 13A are exposed is formed on the optical waveguide core 11 and the side grating waveguides 12 and 13.

Subsequently, the electrode 14 and the electrodes 15 are formed, as illustrated in FIG. 4C.

More specifically, an electrode metal, e.g., aluminum (Al) is deposited on the cladding 25 by sputtering or the like so as to fill the electrode openings 25a and 25b, and Al is worked by lithography and dry etching. Thus, the electrode 14 and the electrodes 15 electrically connected to the side terminal 12A and the side terminals 13A through the electrode openings 25a and 25b are formed.

In the present embodiment, as described above, a phase modulation device improved in modulation efficiency and in controllability simultaneously by a simple and convenient phase modulation method and having high reliability can be realized.

Second Embodiment

The second embodiment will subsequently be described.

Figure 5:
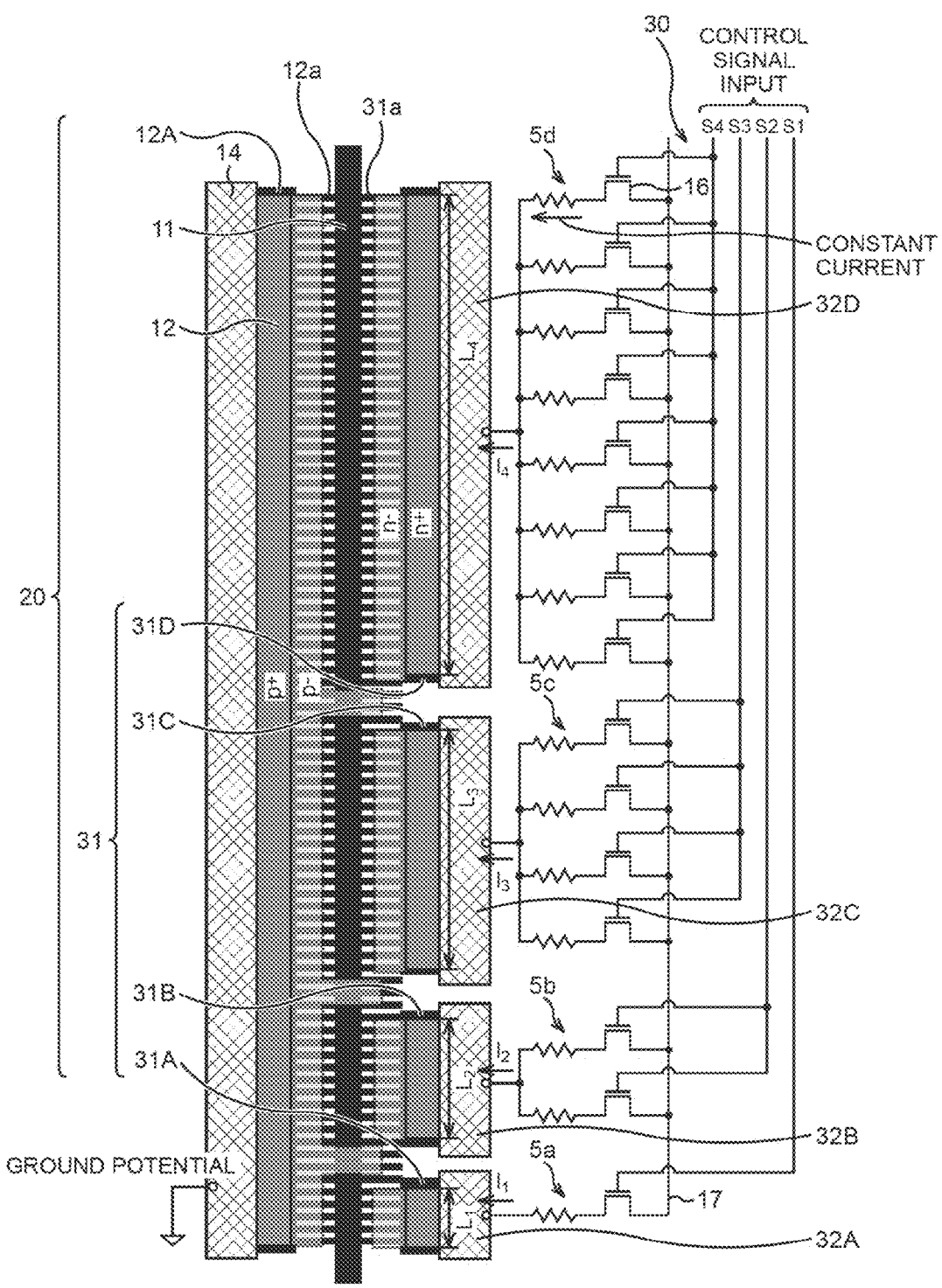
FIG. 5 is a schematic plan view for outlining the construction of a phase modulation device according to a second embodiment.

FIG. 5 is a schematic plan view for outlining the construction of a phase modulation device according to the second embodiment. The same components of the phase modulation device as those described in the description of the first embodiment are indicated by the same reference characters and the detailed descriptions of them will not be repeated.

This phase modulation device is constructed by being provided with a phase modulator 20 formed on a predetermined substrate, and a control unit 30 that controls electrical signals to be input to the phase modulator 20.

The phase modulator 20 has an optical waveguide core 11 and a pair of side grating waveguides 12 and 31 provided on opposite sides of the optical waveguide core 11 along the lengthwise direction. These portions are constructed by being integrally formed by a single silicon layer or the like. A cladding not illustrated, which is formed of a silicon oxide for example, is provided on the optical waveguide core 11 and the side grating waveguides 12 and 31. An electrode 14 is provided on the side grating waveguide 12, and electrodes 32A to 32D are provided on the side grating waveguide 31.

The side grating waveguide 31 has a multiplicity of fins 31a and is connected to the optical waveguide core 11 along the other side surface of the optical waveguide core 11. A plurality of small side terminals 31A to 31D provided as electrode formation portions connected to the fins 31a along this side surface are formed. In the present embodiment, the fins 31a have a width of about 80 nm for example, and a period of about 285 nm for example.

The side terminals 31A to 31D respectively have different operating lengths $L_1$ to $L_4$ are arranged by being spaced apart one from another by a predetermined distance of, for example, about 3 μm while being electrically separated from each other, and are capable of functioning independently of each other. The side terminals are designed so that if the number of side terminals is N, the operating length of the ith one of the N number of side terminals is $L \times 2^{i-1}$ (i=1, . . . , N-1, N) where L is a unit length. In the present embodiment, N=4; the unit length is $250/(2^4-1) \approx 17$ μm; and, from $17 \times 2^{i-1}$ (i=1, 2, 3, 4), the operating lengths $L_1$ to $L_4$ of the side terminals 31A to 31D are as follows. $L_1$ is about 17 μm; $L_2$ is about 34 μm; $L_3$ is about 68 μm; and $L_4$ is about 136 μm.

For the side terminals 31A to 31D, an n-type region doped with an n-type impurity, e.g., phosphorus (P) and formed in portions forming the side terminals 31A to 31D, each of the side terminals 31A to 31D being an $n^+$-type doped region, (part of) portions of the fins 31a connected to the side terminals 31A to 31D being each an $n^-$-doped region. The $p^-$-type doped region in the fins 12a is extended to be formed in (part of) portions of the fins 31a between the side terminals. This extended $p^-$-type doped region improves the reliability of electrical separation between each adjacent pair of side terminals.

The electrodes 32A to 32D are made of Al for example, and connected to the side terminals 31A to 31D.

In the present embodiment, small phase modulators are formed in correspondence with the side terminal 31A and the electrode 32A, the side terminal 31B and the electrode 32B, the side terminal 31C and the electrode 32C, and the side terminal 31D and the electrode 32D. A pin diode is formed in each small phase modulator. A constant current is caused to flow through the diode with a forward bias voltage so that the concentrations of carriers (electrons and holes) in the optical waveguide core 11 at the PN junction of the diode are changed. Thus, the phase of light propagating through the optical waveguide core 11 is changed by utilizing the plasma effect.

The control unit 30 is connected to the electrodes 32A to 32D of the above-described small phase modulators. To the electrodes 32A to 32D, ($2^{i-1}$ (i=1, 2, 3, 4)) numbers of switches corresponding to the operating lengths of the side terminals 31A to 31D are connected in parallel with each other. That is, one switch 16 is connected to the electrode 32A; two switches are connected to the electrode 32B; four switches 16 are connected to the electrode 32C; and eight switches 16 are connected to the electrode 32D, and four control circuits 5a to 5d associated with the electrodes 32A to 32D are formed. A power supply line 17 is connected in common to all the control circuits 5a to 5d.

When the switch 16 is on, the constant current flows through the diode with the forward bias voltage, thereby injecting carriers into the optical waveguide core 11. When the switch 16 is off, the terminal of the diode is grounded and no current flows. The control unit 30 controls stepwise the amount of change in phase of light propagating through the phase modulator 20 by means of the constant currents supplied from the control circuits 5a to 5d.

Each of the control circuits 5a to 5d forms a constant-current source that supplies the predetermined constant current to the small phase modulators by being supplied with a voltage from the power supply line 17. This constant current is set so that the voltage applied to the diode of the small phase modulators is equal to or higher than a predetermined voltage in the forward direction, 0.9 V in the present embodiment. If the number of side terminals is N, the current value of the constant-current source connected to the electrode of the ith one of the N number of side terminals of the small phase modulator is designed to $0.147 \times 2^{i-1}$ mA (i=1, . . . , N-1, N). In the present embodiment, N=4 and the current values of the constant-current sources connected to the electrodes 32A to 32D are as follows. $I_1$ is about 0.147 mA; $I_2$ is about 0.294 mA; $I_3$ is about 0.588 mA; and $I_4$ is about 1.176 mA. The current values of the constant-current sources connected to the electrodes 32A to 32D are set to the values proportional to the operating lengths $L_1$ to $L_4$.

In the present embodiment, the phase modulator is divided into four small phase modulators, and a control signal line S1 is connected to the control circuit 5a; a control signal line S2, to the control circuit 5b; a control signal line S3, to the control circuit 5c; and a control signal line S4, to the control circuit 5d. As a result, the phase of propagating light can be changed in sixteen steps from 0 to about π. The number of electrical connections between the control circuits and the small phase modulators can be reduced by reducing the number of divisions as small phase modulators. Also, loss of propagating light due to the p-type impurity with which the separated regions are doped can be reduced.

In the present embodiment, as described above, a phase modulation device improved in modulation efficiency and in controllability simultaneously by a simple and convenient phase modulation method and having high reliability can be realized.

In the phase modulation devices according to the first and second embodiments described above, the structure, materials, numbers, lengths and set current values are not limited to those described above.

In the first and second embodiments, each of the pair of side grating waveguides on the optical waveguide core 11 may be divided as desired in correspondence with a plurality of side terminals like the side grating waveguide 13 (first embodiment) or the side grating waveguide (second embodiment).

The control signals connected to phase modulator may be low-speed signals which are substantially direct-current signals or high-speed signals of 100 Mb/s or higher. In the latter case, the phase modulation device according to the first or second embodiment may be formed as a high-speed multivalue phase modulator.

Third Embodiment

The third embodiment will subsequently be described. A Mach-Zehnder modulation device to which a phase modulator according to the first or second embodiment, represented by a phase modulator according to the second embodiment herein, is applied is disclosed as the third embodiment.

Figure 6:
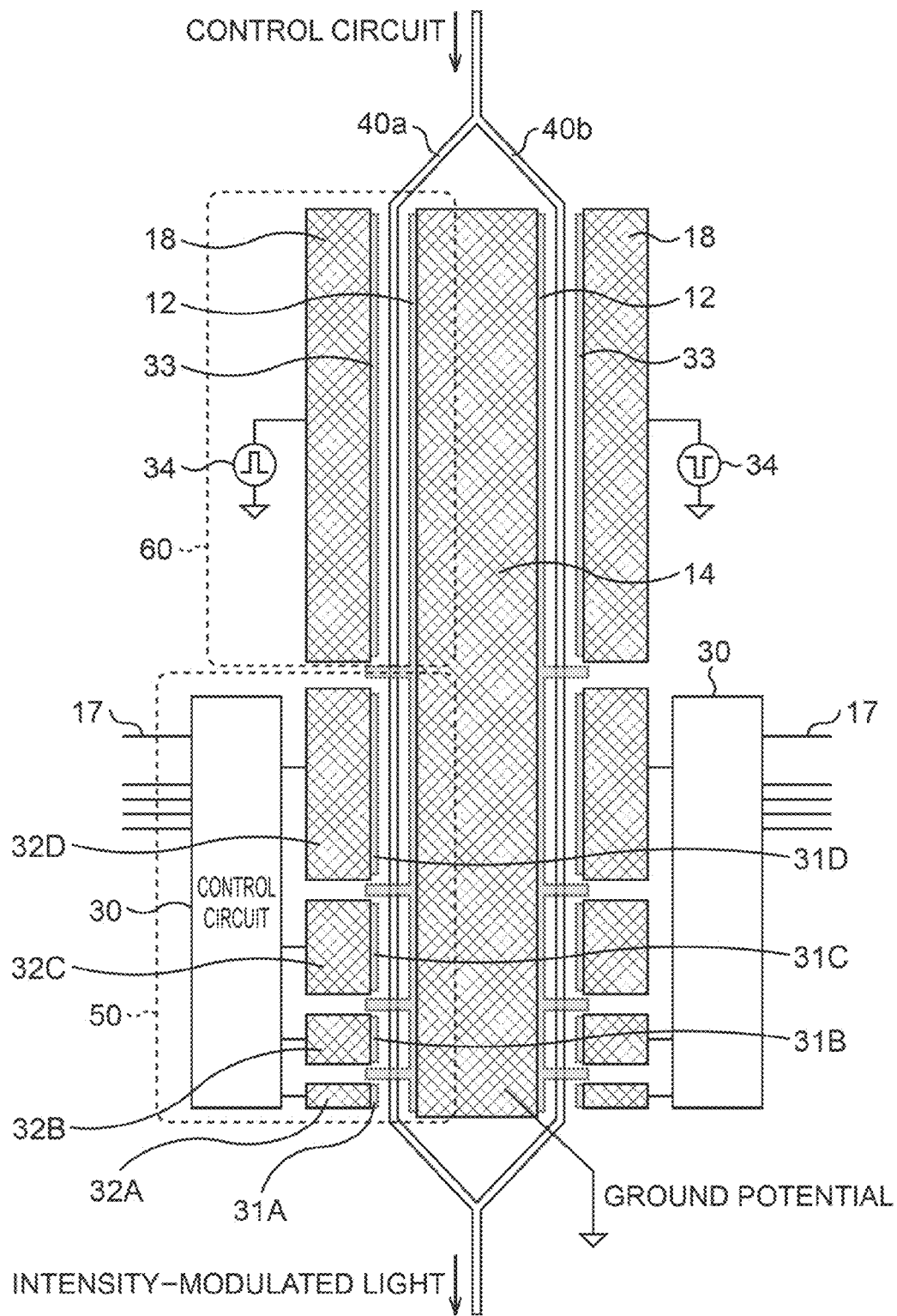
FIG. 6 is a schematic plan view for outlining the construction of a Mach-Zehnder modulation device according to a third embodiment.

FIG. 6 is a schematic plan view for outlining the construction of a Mach-Zehnder modulation device according to the third embodiment. The same components of the phase modulator as those described in the descriptions of the first and second embodiments are indicated by the same reference characters and the detailed descriptions of them will not be repeated.

In this Mach-Zehnder modulation device, an optical waveguide has two arms 40a and 40b. Input continuous light is divided into two by the arms 40a and 40b, and two lights are combined to output intensity-modulated light. A high-speed phase modulator 60 is provided on each of input-side front half portions of the arms 40a and 40b, and a phase modulator 50 according to the second embodiment is provided on each of output-side rear half portions of the arms 40a and 40b.

The high-speed phase modulator 60 has side grating waveguides 12 and 33 provided on opposite sides of each of the arms 40a and 40b. In the side grating waveguide 12, a $p^-$-type doped region and a $p^+$-type doped region are formed, as described above. In the side grating waveguide 33, an $n^-$-type doped region and an $n^+$-type doped region are formed in correspondence with the side grating waveguide 12. The side grating waveguide 12, the arm 40a (40b) and the side grating waveguide 33 form pin diodes. An electrode 18 is formed on each of the side grating waveguides 12 and 33, and a high-speed signal source 33 is connected to the electrode 18. The electrode 14 is maintained at ground potential.

With the Mach-Zehnder modulation device in the present embodiment, the phase of light passing through the optical waveguide can be efficiently adjusted through direct currents with improved controllability.

In the above described various modes, a phase modulation device improved in modulation efficiency and in controllability simultaneously by a simple and convenient phase modulation method and having high reliability is realized.

Collective descriptions of various modes of the phase modulation device and the method of controlling the phase modulation device are added below.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A phase modulation device comprising:
a diode-type phase modulator which has a plurality of first side terminals arranged side by side on and connected to one side of an optical waveguide core along an optical axis of the optical waveguide core, and a second side terminal connected to an other side of the optical waveguide core along the optical axis of the optical waveguide core;
electrodes each connected to each of the plurality of first side terminals;
first conductivity type regions each formed on each of the first side terminals;
a second conductivity type region formed on the second side terminal; and
a control unit that controls electrical signals to be input to the phase modulator, wherein
the control unit has switches connected to the electrodes and constant-current sources that supply a constant current to the electrodes and controls stepwise a phase change for light propagating in the optical waveguide core according to the number of the switches turned on, and
a part of the second conductivity type region is crossing over the optical waveguide core, extended to a space between every two of the first conductivity type regions, and located close to the first conductivity type regions without contact with the first conductivity type regions, in a plan view.

2. The phase modulation device according to claim 1, wherein a current value of each of the constant-current sources is set so that a voltage applied to each diode of the phase modulator is equal to or higher than 0.9 V in a forward direction when the switch is turned on.

3. The phase modulation device according to claim 1, wherein operating lengths of the first side terminals are equal to each other, and current values of the constant-current sources are set equal to each other.

4. The phase modulation device according to claim 1, wherein if the number of the first side terminals is N, the length of the ith one of the first side terminals and a current value of the constant-current source are set to $L \times 2^{i-1}$ and $I \times 2^{i-1}$, respectively (i=1, . . . , N−1, N) by using constant values L and I.

5. The phase modulation device according to claim 1, wherein a Mach-Zehnder optical waveguide having two arms is formed, and
wherein the phase modulator is provided on at least one of the two arms functioning as the optical waveguide core.

* * * * *